(12) United States Patent
Philippe et al.

(10) Patent No.: US 9,658,405 B2
(45) Date of Patent: May 23, 2017

(54) CONNECTOR FOR COLLIMATED OPTICAL FIBER

(71) Applicant: SOURIAU, Versailles (FR)

(72) Inventors: Alain Philippe, Change (FR); Sébastien Claudot, Thorigné sur Dué (FR)

(73) Assignee: SOURIAU, Versailles (FR)

( * ) Notice: Subject to any disclaimer, the term of this patent is extended or adjusted under 35 U.S.C. 154(b) by 0 days.

(21) Appl. No.: 15/090,415

(22) Filed: Apr. 4, 2016

(65) Prior Publication Data

US 2016/0320566 A1    Nov. 3, 2016

(30) Foreign Application Priority Data

Apr. 9, 2015 (FR) ..................... 15 53086

(51) Int. Cl.
*G02B 6/38* (2006.01)
*G02B 6/32* (2006.01)

(52) U.S. Cl.
CPC ............. *G02B 6/3821* (2013.01); *G02B 6/32* (2013.01); *G02B 6/3825* (2013.01); *G02B 6/3853* (2013.01); *G02B 6/3882* (2013.01); *G02B 6/3883* (2013.01); *G02B 6/3885* (2013.01); *G02B 6/3894* (2013.01)

(58) Field of Classification Search
CPC .. G02B 6/3885; G02B 6/3893; G02B 6/3825; G02B 6/3897; G02B 6/3887; G02B 6/38
See application file for complete search history.

(56) References Cited

U.S. PATENT DOCUMENTS

| 6,309,112 | B1 | 10/2001 | Lecomte | |
|---|---|---|---|---|
| 7,298,942 | B2 * | 11/2007 | Blasingame | ......... G02B 6/4292 385/33 |
| 7,722,261 | B2 * | 5/2010 | Kadar-Kallen | .......... G02B 6/32 385/72 |

FOREIGN PATENT DOCUMENTS

EP         1 026 527 A1    8/2000

* cited by examiner

*Primary Examiner* — Jennifer Doan
(74) *Attorney, Agent, or Firm* — Im IP Law; C. Andrew Im

(57) ABSTRACT

A single-channel or multiple-channel connector for collimated optical fibers. A female part body of connector includes a receiving cavity with a guide bush and a lensed socket. The lensed socket includes an optical fiber contained in a ferrule and held in a tubular casing guided and fitted in the guide bush. The optical fiber is held axially in the guide bush in the free position flush with the front face of the female part by a spring acting axially on the lensed socket, thereby permitting the lens can be cleaned easily. A male part of the connector includes a lensed pin with an optical fiber contained in a ferrule held in a tubular casing. The lensed pin is flush with the front face of the male part.

12 Claims, 3 Drawing Sheets

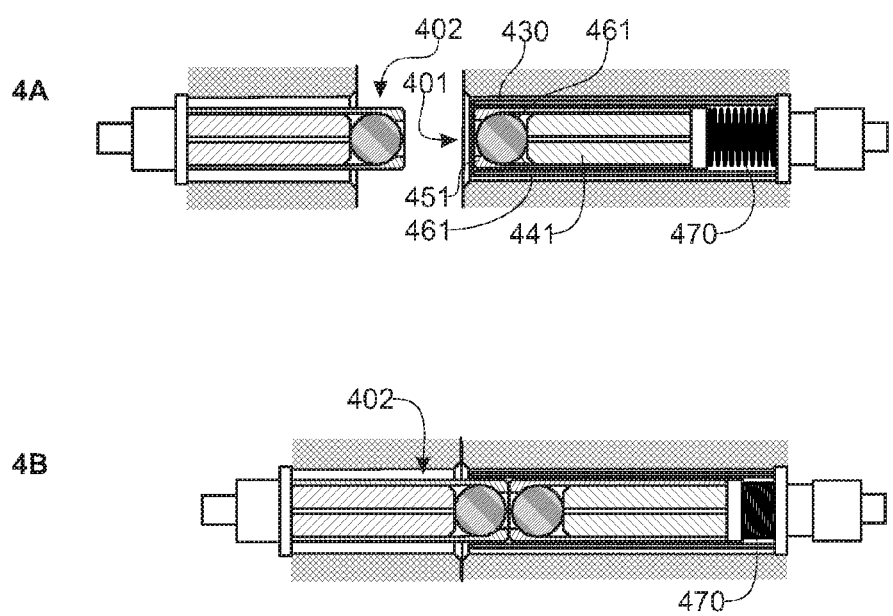
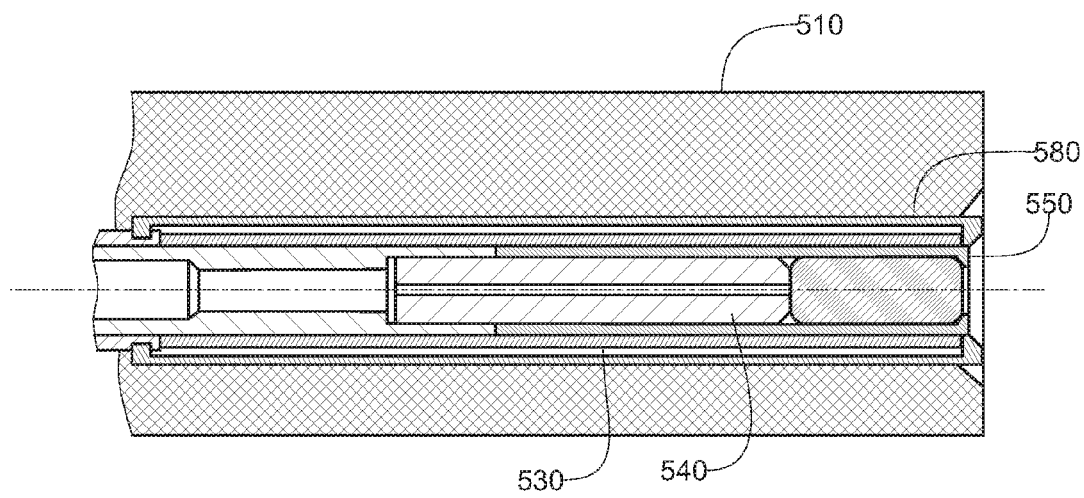
Fig. 4
Fig. 5

CONNECTOR FOR COLLIMATED OPTICAL FIBER

RELATED TO APPLICATIONS

This application claims priority from French Patent application No. 15 53086 filed Apr. 9, 2015, each of which is herein incorporated by reference in its entirety.

FIELD OF THE INVENTION

The invention relates to a connector for collimated optical fibers. The invention is intended for the field of devices for the longitudinal connection, using a butt joint, of two optical fibers protected by ferrules, where said connection provides signal continuity between said fibers. The invention is suitable for single-channel connectors and multiple-channel connectors alike. The invention is more particularly suitable for making a butt joint between two optical fibers.

BACKGROUND OF THE INVENTION

The document EP 1 026 527 describes a fiber-to-fiber type connector with a sliding sleeve that allows access to the end of the fiber in the female part of the connector for cleaning said end.

OBJECT AND SUMMARY OF THE INVENTION

The connector according to the invention uses a lens at the exit of each fiber in order to widen the beam by collimating it, that is to say by creating a beam of rays parallel to the center line of the fiber. Compared to a fiber-to-fiber connection, a connection through a collimated contact is more tolerant in respect of the relative axial positioning of the contacts and any dirt present on the ends of said contacts. However, due to the very presence of lenses, such a connection shows higher insertion loss than a fiber-to-fiber contact, and said insertion loss can commonly reach 1.5 dB, compared to 0.3 dB with fiber-to-fiber contact. That loss of insertion is even greater if the lenses are polluted, particularly in the presence of a lateral or angular relative positioning fault of the optical fibers.

The invention is aimed at ensuring minimum insertion loss between two optic fibers connected by collimated contacts and relates, to that end, to a connector for optical fibers comprising:
 a. a part known as the female part, comprising a body with a front face and a receiving cavity comprising:
  ai. a guide bush;
  aii. a socket comprising an optical fiber contained in a ferrule held in tubular casing fitted in the guide bush, with a contact end ending in a lens;
  aiii. a spring, which applies, on said socket, axial sliding force in relation to the receiving cavity between an axial position known as the free position of said socket where the lens is flush with the front face of the body, and an axial position known as the engaged position where the lens is retracted in the guide bush over a distance that is equal to or greater than one socket diameter, while remaining centered in said guide bush over a length equal to or greater than one socket diameter;
 b. a part known as the male part, comprising a body and a pin, comprising an optical fiber contained in a ferrule held in tubular casing with a diameter adjusted for the bore diameter of the guide bush of the female part, with the contact end ending in a lens;
 c. means for coupling the female part with the male part.

Thus, the action of the spring on the socket of the female part of the connector makes it possible to put the lens in a flush position so that it can be cleaned easily.

The invention can be implemented advantageously in the embodiments and alternatives described below, which may be considered individually or in any technically operative combination.

In one alternative embodiment, the guide bush is fixed axially in the body of the female part. This alternative makes it possible to protect the guide bush from damage when the connector is open.

Thus, in an advantageous embodiment, the axial end of the guide bush is axially recessed in relation to the front face of the female part, and advantageously, the insertion cavity comprises a bevel in the body of the female part before the end of the guide bush. Said bevel makes it easier to center the pin of the male part in the female part when the connector is coupled.

In one embodiment, the socket of the connector according to the invention comprises:
 d. a cage for holding the guide bush.

This embodiment makes the relative centering of the pin and the socket independent from the body of the connector.

In a particularly advantageous embodiment, the male part of the connector according to the invention comprises a guide cavity and the connector in this embodiment comprises:
 bi. a spring that applies, on said pin, axial sliding force in relation to the guide cavity between an axial position known as the free position where said pin protrudes from the front face of the male part over a distance greater than one pin diameter, and a position known as the engaged position where the male part is connected to the female part of the connector and the pin enters the guide bush over a distance equal to or greater than one diameter of said pin.

Thus, the combined action of the two springs gives the pin and socket optimum relative axial positioning when the male and female parts of the connector are assembled, independently from the relative axial positioning of the two parts.

In one alternative embodiment, the springs acting on the pins of the male and female parts are identically stiff. This embodiment essentially uses the same components for male and female parts and is more economical.

Advantageously, the spring acting on the pin of the male part is stiffer than the spring acting on the socket of the female part. Even though it retains the benefits of axially floating contact, this embodiment ensures that the pin of the male part enters over a sufficient guide length into the guide bush of the female part.

Advantageously, the lenses of the pins of the male and female parts are axially recessed in relation to the end of said pin and socket. This arrangement protects the lenses from scratching, particularly when the pin and socket are in axial contact in the guide bush. The slightly prominent part of the end of the pin in relation to the lens also cooperates with the entry bevel of the female part, when it has one, to favor the radial centering of the pin of the male part in the guide bush, without risking damage to the surface of the lens.

In a particular embodiment, the ends of the pins of the male and female parts end in flat windows. This embodiment makes it possible to better protect the ends of the pin and socket, particularly lenses. The drawbacks of the presence of these windows relating to the loss of insertion are minimized by the possibility of cleaning the ends of contacts and the accurate relative axial positioning of the two ends.

The invention also relates to a multiple-channel connector for collimated optical fibers comprising:
- a female part body comprising a plurality of receiving cavities, each comprising a guide bush and a lensed socket comprising an optical fiber contained in a ferrule and held in tubular casing guided and fitted in said guide bush and held axially in the bush in the free position flush with the front face of the female part, by a spring acting axially on said socket;
- a male part comprising a body with a plurality of guide cavities, in each of which a lensed pin comprising an optical fiber contained in a ferrule held in tubular casing can slide, wherein the pin is axially held by a spring in the free position, protruding from the front face of said male part.

That multiple-channel connector benefits from the characteristics of the invention to achieve optimum relative positioning of the male and female contacts.

Advantageously, the pins of the male part allow radial play in relation to the guide cavity. Thus, the radial centering of the pins in relation to the sockets in the guide bushes is not excessively static while connecting the two parts.

BRIEF DESCRIPTION OF THE DRAWINGS

The invention is described below in its preferred embodiments, which are not limitative in any way, and by reference to FIGS. 1 to 5, wherein:

FIG. 4 is a schematic longitudinal sectional view of another exemplary embodiment of a connector according to the invention, in the open position in FIG. 4A and in the coupled position in FIG. 4B, and FIG. 5 is a longitudinal sectional view of an exemplary embodiment corresponding to the socket of the connector according to the schematic diagram of FIG. 4.

DETAILED DESCRIPTION OF THE EMBODIMENTS

Figure 1:
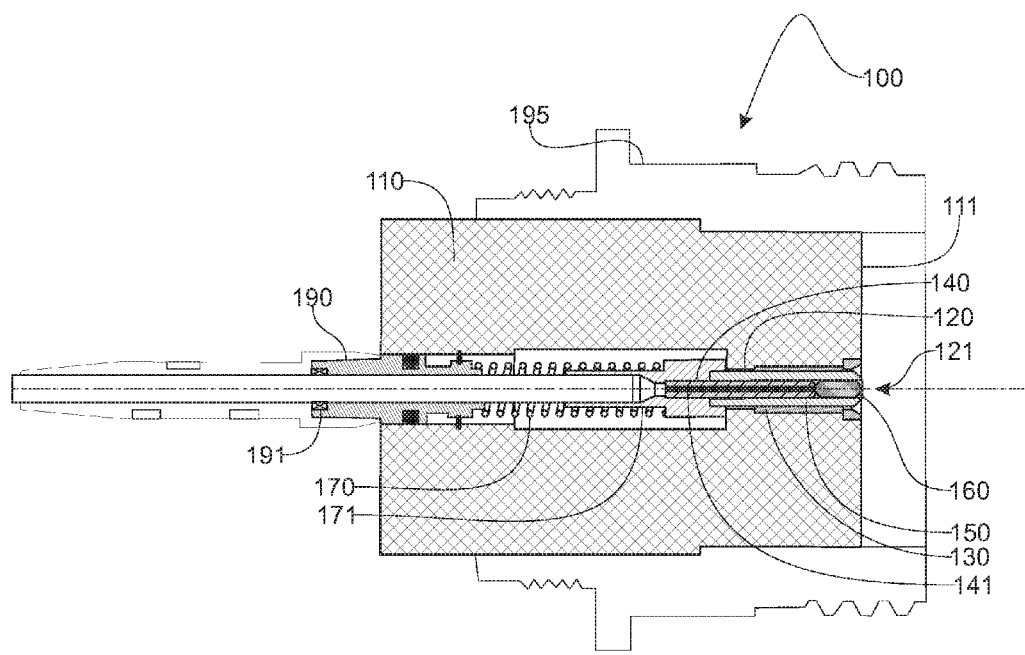
FIG. 1 is a longitudinal sectional view of an exemplary embodiment of what is known as the female part of the connector according to the invention.

In FIG. 1 of an exemplary embodiment of the female part (100) of a single-channel connector according to the invention, the connector has a body (110) comprising a front face (111). Said body is drilled with an insertion cavity (120) with a beveled entrance (121). In some exemplary embodiments, said body is made of molded plastic or comprises an assembly of several parts, using techniques that are known in the prior art. In this exemplary embodiment, a guide bush (130) is fixed in the insertion cavity (120), where said guide bush may for example be made of ceramic or steel to provide rigidity. The optical fiber (141) is contained in a ceramic ferrule (140), and the assembly is mounted in casing (150) made of ceramic or metal. That assembly makes up a socket. The ferrule (140) is centered in the casing and said tubular casing (150) fits in the guide bush (130) with no play. At its axial end, the casing holds a collimating lens (160) in contact with the ends of both the optical fiber (141) and the ferrule (140). The lens is assembled in a sealed manner with the fiber, ferrule and casing, for example by gluing. A helical compression spring (170), in this exemplary embodiment, applies axial thrust on the socket by means of a pusher (171), limiting its axial travel so that in the free state as represented, the end of the lens is flush with the front face (111) of the body and the guide bush in this exemplary embodiment. Thus, the lens (160) is easily accessible in this position for cleaning its surface. The spring (170) is stopped at its other end on a sealed feed-through (190) fixed to the body of the connector and comprising sealing means (191) that enable the cable containing the optical fiber to slide axially through said sealed feed-through (190). Lastly, that half-connector (100) comprises means (195) for coupling it with another half-connector.

Figure 2:
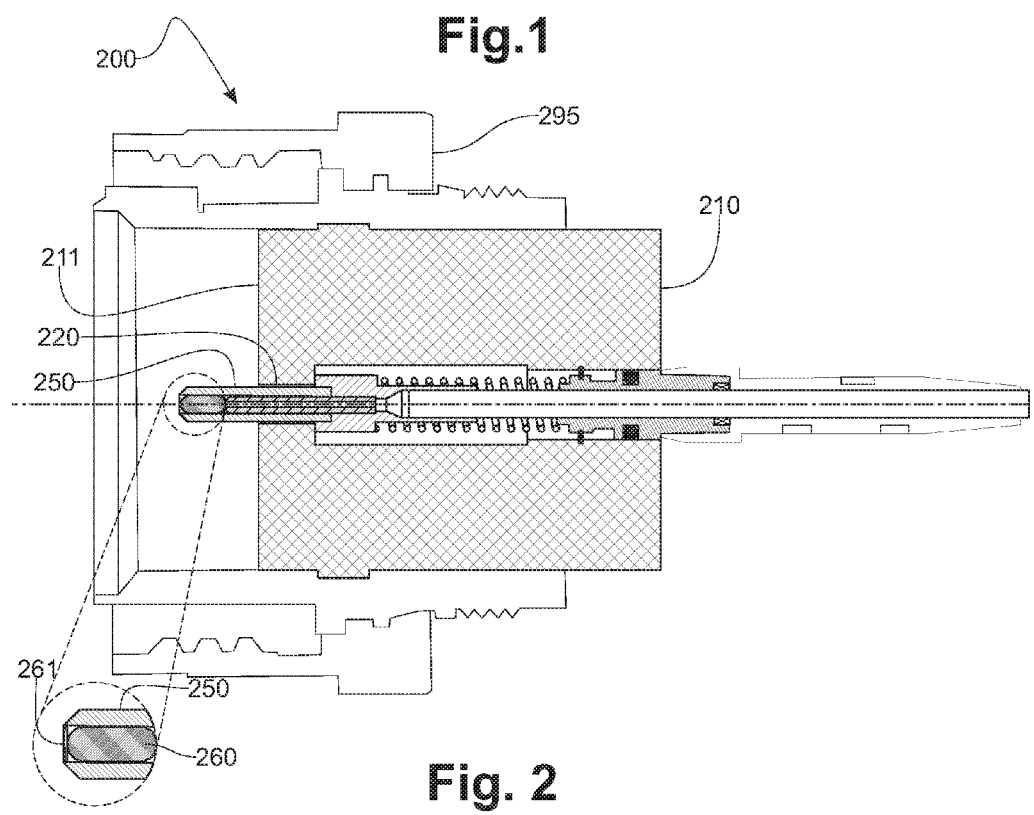
FIG. 2 is a view of the same longitudinal section of what is known as the male part of the connector according to the invention suitable for coupling with the female part of FIG. 1, a detailed view shows an exemplary embodiment of the end of the pin.

In FIG. 2, the male part (200) comprises in this exemplary embodiment substantially the same means as the female part and comprises coupling means (295) that are complementary with those of the female part, in order to connect the two half-connectors. Unlike the female part, the pin protrudes out of the front face (211) of the body (210) of the connector, over a length at least equal to the diameter of said pin. The tubular casing (250) of the pin of the male part is fitted with no diameter play in relation to the guide bush of the socket. The pin of the male part slides freely in a guide cavity (220) of the body (210) of the male part, with which it advantageously has radial play. In a detailed view, the collimation lens (260) at the end of the pin is slightly recessed axially in relation to the axial end of the casing (250). Said lens (260) is thus protected, particularly when the pin is inserted in the insertion cavity of the female part. In one embodiment, particularly adapted to the implementation of the connector in harsh environments, a window lens (261) protects the end of the collimating lens (260). The same end arrangements are possible on the socket of the female part.

Figure 3:
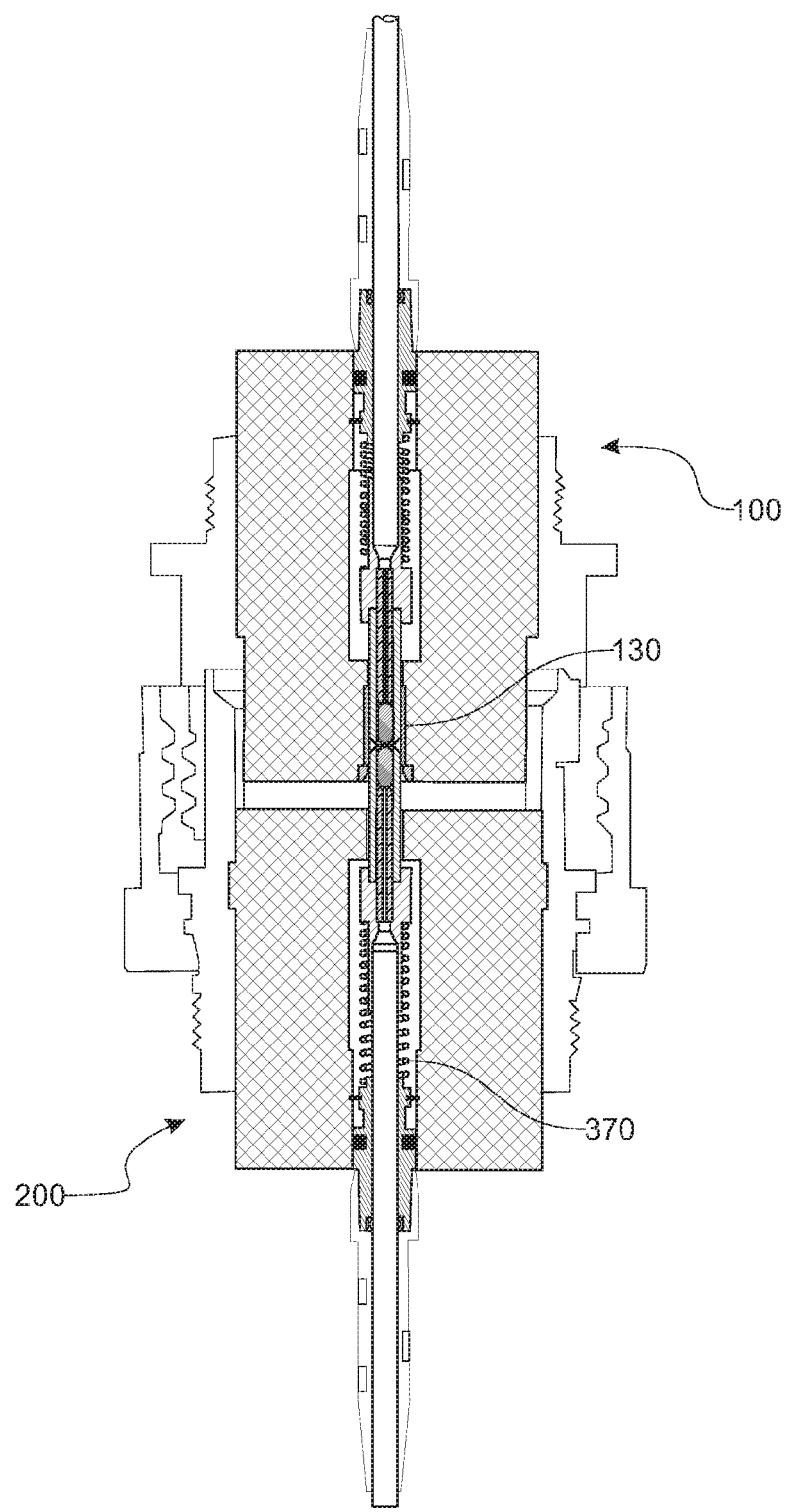
FIG. 3 is a longitudinal sectional view of an assembly of the male and female parts of an exemplary embodiment of a connector according to the invention corresponding to FIGS. 1 and 2.

In FIG. 3, when the two parts (100, 200) of the connector are assembled, the pin of the male part enters into the insertion cavity of the socket, pushing the socket of said female part, which slides in the guide bush (130). Thus, the pin and socket are centered in relation to each other by said guide bush. The springs acting on the pin and socket maintain axial contact between the ends of the pin and socket. Depending on the embodiment, the two springs (170, 370) are similarly stiff, or the spring (370) that acts on the pin of the male part (200) is stiffer than that acting on the female part. The combination of stiffness of the springs is selected, particularly, to center the pin and socket in the guide bush over a length at least equal to a pin diameter. The radial gap between the pin of the male part and the guide cavity of that male part is adapted to allow said guide pin to be centered without generating the constraints of excessively static assembly in relation to other manners of centering or making the assembled connector foolproof. Thus, advantageously, the axial end of the pin comprises a shape, for example a bevel, suitable for cooperating with the entrance bevel of the receiving cavity of the female part of the connector. Advantageously, the casing of the pin is made of material that is harder than the material making up the beveled entrance of the insertion cavity of the female part.

As the pin and socket of the two parts of the connector are kept pressed against each other and are both centered in a rigid guide bush, the connection can withstand the vibrations and minor impacts to which the connector may be exposed. Further, the collimation lenses limit the sensitivity of the contacts to axial deviations between the pin and the socket. Additionally, the sealing means allow said connection to withstand the environmental conditions. Thus, the connector according to the invention is particularly suitable for stringent environments such as applications in the field of aeronautics.

The same configuration of pins and sockets is used in a multiple-channel connector where the pin and socket assemblies are parallel to each other, and the pins are all located on the same male half-connector and the sockets are all located on the same female half-connector. In order to make it easier to center all the pins and sockets, the radial play allowed to pins in their guide cavity is advantageously larger than in the case of a single-channel connector.

In FIG. 4 of another embodiment, the pin (402) is fixed axially in relation to the body of the pin and the guide bush (430) is connected to the socket (401). In FIG. 4A, the socket (401) made up of the ferrule (441), the tubular casing (451) and the lens (461) of the socket slides in said guide bush (430), where a spring (470) applies axial force on the assembly so that in the position known as the free position, the lens (461) is flush with the axial end of the guide bush.

In FIG. 4B, when the male and female parts of the connector according to this exemplary embodiment are coupled, the pin (402) enters into the guide bush (430), thus centered perfectly in relation to the socket (401), by axially pushing said socket by compressing the spring (470), the axial action of which holds the ends of the pin and socket in contact. In an advantageous alternative (not shown) of this embodiment, the guide bush is partly split in the longitudinal direction, in order to allow centering with no play of the pin (402) in said bush by elasticity.

Thus, the guide bush (430) is connected to the socket and not the body of the connector, and so this embodiment makes it possible to reduce the mechanical stresses on said bush (430) during insertion manoeuvers, thus limiting slippage of its calibration and retaining the perfect centering of the pin and socket over time. The axially sliding assembly of the socket inside said guide bush and its flush position in relation to the end of said bush in the free position protects the totality of the surface of the bush from dust and impacts, in the connector and outside it, even without a cap. Thus, the guide bush retains high radial elasticity and a good surface condition to allow the effective relative centering of the pin and the socket and the retaining of the optical performance of the connector according to the invention.

In FIG. 5 of an exemplary implementation of the previous embodiment, the guide bush (530) of the connector according to the invention is held in a cage (580) that is fixed to the socket. The tubular casing (550) made of ceramic material or metal is centered on the ferrule (540) of the contact and guided in the guide bush (530). Thus, in this embodiment, the alignment guides of the pins and sockets are independent of the body (510) of the connector.

The description above and the exemplary embodiments show that the invention achieves its set objectives, namely that it makes it possible to obtain a connector for optical fibers that is rugged and insensitive to environmental conditions.

The invention claimed is:
1. A connector for optical fibers comprising:
a female part comprising a body with a front face and a receiving cavity comprising:
a guide bush;
a socket comprising an optical fiber contained in a ferrule held in a tubular casing fitted in the guide bush with a contact end of the socket ending in a lens;
a spring which applies, on said socket, an axial sliding force in relation to the receiving cavity between a free axial position of said socket where the lens is flush with the front face of the body, and an engaged axial position where the lens is retracted in the guide bush over a distance that is equal to or greater than one socket diameter, while remaining centered in the guide bush over a length equal to or greater than one socket diameter;
a male part comprising a body and a pin comprising an optical fiber contained in a ferrule held in a tubular casing with a diameter adjusted for a bore diameter of the guide bush of the female part with a contact end of the pin ending in a lens; and
a coupler to couple the female part to the male part.

2. The connector according to claim 1, wherein the guide bush is fixed axially in the body of the female part.

3. The connector according to claim 2, wherein an axial end of the guide bush is axially recessed in relation to the front face of the female part.

4. The connector according to claim 1, wherein the socket comprises a cage to hold the guide bush.

5. The connector according to claim 3, wherein the receiving cavity comprises a bevel in the body of the female part opposite the axial end of the guide bush.

6. The connector according to claim 1, wherein the body of the male part comprises a guide cavity and the connector further comprises:
a spring that applies, on the pin, axial sliding force in relation to a guide cavity between a free axial position where the pin protrudes from a front face of the male part over a distance greater than one pin diameter, and an engaged axial position where the male part is connected to the female part of the connector and the pin enters the guide bush over a distance equal to or greater than one diameter of the pin.

7. The connector according to claim 6, wherein the springs acting on the socket of the female part and the pin of the male part are identically stiff.

8. The connector according to claim 6, wherein the spring acting on the pin of the male part is stiffer than the spring acting on the socket of the female part.

9. The connector according to claim 1, wherein the lens of the pin of the male part is axially recessed in relation to the contact end of the pin or the lens of the socket of the female part is axially recessed in relation to the contact end of the socket.

10. The connector according to claim 1, wherein the contact end of the pin of the male part or the contact end of the socket of the female part ends in a flat window.

11. A multiple-channel connector for collimated optical fibers, comprising:
a female part body comprising a plurality of receiving cavities, each receiving cavity comprising a guide bush and a lensed socket comprising an optical fiber contained in a ferrule and held in a tubular casing guided and fitted in said respective guide bush and held axially in said respective guide bush in a free position flush with a front face of the female part by a spring acting axially on said respective lensed socket; and
a male part body comprising a plurality of guide cavities, in each of which a lensed pin comprising an optical fiber contained in a ferrule held in a tubular casing slides, wherein the lensed pin is axially held by a spring in a free position and the lensed pin protrudes from a front face of the male part body.

12. The multiple-channel connector according to claim 11, wherein each lensed pin is configured to move radially in relation to a corresponding guide cavity.

\* \* \* \* \*